(12) United States Patent
Smith et al.

(10) Patent No.: US 6,835,353 B2
(45) Date of Patent: Dec. 28, 2004

(54) CENTRIFUGE TUBE ASSEMBLY

(75) Inventors: Emery Smith, Fort Myers, FL (US);
Patrick Pennie, Fort Myers, FL (US);
David K. Buzenius, Fort Myers, FL (US)

(73) Assignee: Perfusion Partners and Associates, Inc., Fort Myers, FL (US)

( * ) Notice: Subject to any disclaimer, the term of this patent is extended or adjusted under 35 U.S.C. 154(b) by 183 days.

(21) Appl. No.: 10/163,959

(22) Filed: Jun. 6, 2002

(65) Prior Publication Data

US 2002/0185457 A1 Dec. 12, 2002

Related U.S. Application Data

(60) Provisional application No. 60/296,243, filed on Jun. 6, 2001.

(51) Int. Cl.[7] ............................. B01D 21/26; A01N 1/02
(52) U.S. Cl. ................. 422/102; 210/416.1; 210/512.1; 422/100
(58) Field of Search ........................... 210/416.1, 512.1; 422/100, 101, 102; 494/43, 56

(56) References Cited

U.S. PATENT DOCUMENTS

| | | | | |
|---|---|---|---|---|
| 3,901,629 A | * | 8/1975 | Chancholle et al. | 417/395 |
| 4,058,252 A | * | 11/1977 | Williams | 494/1 |
| 4,120,662 A | * | 10/1978 | Fosslien | 73/864.24 |
| 4,809,860 A | * | 3/1989 | Allen | 220/502 |
| 5,455,007 A | * | 10/1995 | Calvo et al. | 422/100 |
| 5,555,920 A | * | 9/1996 | Godolphin et al. | 141/329 |
| 5,707,331 A | * | 1/1998 | Wells et al. | 494/20 |

FOREIGN PATENT DOCUMENTS

GB        2 222 086 A   *   2/1990

* cited by examiner

Primary Examiner—John Kim
(74) Attorney, Agent, or Firm—William E. Noonan

(57) ABSTRACT

A centrifuge tube assembly includes an elongate tubular receptacle and a cap that attached to the receptacle. The cap includes a pair of ports formed therethrough for communicating with an interior of the tubular receptacle. A pair of aspiration pipes having different lengths are engaged with the respective ports and extend longitudinally through the cylindrical receptacle. One of the pipes extends to a point proximate the bottom of the tubular receptacle and the other pipe extends to a level spaced above the bottom of the tube.

15 Claims, 4 Drawing Sheets

CENTRIFUGE TUBE ASSEMBLY

RELATED APPLICATION

This application claims the benefit of U.S. Provisional Patent Application Ser. No. 60/296,243 filed Jun. 6, 2001.

FIELD OF THE INVENTION

This invention relates to an improved centrifuge tube assembly, which enables chemicals or bodily fluids to be effectively separated and aspirated after they have been centrifuged. More particularly, this invention relates to an apparatus that conveniently sequesters platelet-rich plasma for use in surgical and medical procedures.

BACKGROUND OF THE INVENTION

Platelet-rich blood plasma is required for use in various medical procedures. This blood product is particularly effective due to its growth promoting features, which assist greatly in wound healing and bone regeneration. Presently, blood plasma with a high concentration of platelets is utilized for dental implants and other periodontal procedures, facial reconstruction, oral or maxillofacial surgery and chronic wound care. In order to obtain a required concentration of platelets, a blood sample normally must be centrifuged in order to separate the blood into its component blood products (i.e. plasma, red blood cells and platelets). The platelets, typically in a form of a white "buffy coat", are then separated from the blood sample and sequestered in concentrated form through aspiration. Conventional aspiration techniques often fail to provide a satisfactory concentration of platelets. Cross-contamination between the constituent products is frequently encountered. We have determined that the need exists for a cost effective apparatus that facilitates the sequestration of platelets while minimizing cross-contamination between blood components.

SUMMARY OF THE INVENTION

It is therefore an object of the present invention to provide an improved centrifuge tube assembly that allows chemicals or fluids and primarily blood to be aspirated in discrete components much more effectively and cost efficiently than has been achieved using conventional centrifuge tubes.

It is a further object of this invention to provide a centrifuge tube assembly that permits chemicals and bodily fluids to be separated and individually aspirated with minimal cross-contamination.

It is a further object of this invention to provide a centrifuge tube that is particularly effective for sequestering a high concentration of platelet-rich blood plasma for use in various medical procedures.

It is a further object of this invention to provide a centrifuge tube may be used in various medical and veterinary applications.

This invention features a centrifuge tube assembly having an elongate tubular receptacle and a cap that is removably or permanently engaged with an open upper end of the tubular receptacle. First and second ports are formed in the cap for communicating with an interior of the tubular receptacle. A first aspiration pipe is communicably connected to the first port and a second aspiration pipe is similarly connected to the second port. The first aspiration pipe extends to a point proximate to a lower end of the tubular receptacle such that fluid within the tube may be aspirated through the first aspiration pipe from a lower end of the tubular receptacle. The second aspiration pipe extends downwardly through the tubular receptacle to a level spaced above the lower end of the first aspiration pipe. Fluid located above that level may be aspirated through the second aspiration pipe and the second port.

In a preferred embodiment, the first and second ports comprise Luer™ ports formed through the cap. The first aspiration pipe may extend substantially to the bottom of the tubular receptacle. The second aspiration pipe may extend to a level of approximately 5 ml within the tubular receptacle. The first and second aspiration pipes may be interengaged with the first and second ports in a snug, fitted relationship.

A vent hole may be formed through the cap and into the tubular receptacle for neutralizing pressure within the receptacle. The vent hole may have a diameter of about 1–2 mm.

The aspiration pipes may have diameters of about 3 mm each and may include various lengths in accordance with this invention. The tubular receptacle capable of accommodating varying volumes. Graduated markings may be formed at various desired intervals along the side of the tubular receptacle.

A method of separating blood into constituent blood products using the foregoing assembly is also featured. Initially, a blood sample is introduced into the tubular receptacle and the cap is attached to the receptacle such that the interengaged aspiration pipes are inserted into the tubular receptacle. The blood is then centrifuged for a desired period of time, e.g. 5–7 minutes. This separates the blood into discrete components, which form layers within the tube, i.e. red blood cells at the lower end, yellow plasma proximate the upper end and platelets in the form of a white buffy coat between the red blood cells and plasma. After centrifuging is complete, the red blood cells are aspirated through the first aspiration pipe. This aspiration procedure continues until the boundary between the red blood cells and platelets reaches the bottom of the tube. The apparatus is then centrifuged a second time for an additional period of typically 5–7 minutes. Typically, two discrete layers of blood products remain, the white buffy coat proximate the lower end of the tube and plasma above the buffy coat. The plasma is largely removed by aspirating it through the second aspiration pipe. As a result, platelet-rich plasma remains within the tubular receptacle after the second aspiration is completed. This product is then used as needed for various medical and surgical procedures.

In an alternative version of this invention, a single aspiration port and engaged pipe may be used. The pipe may be slidable or otherwise longitudinally adjustable through a snug opening in the closure. This enables the lower end of the pipe to be positioned at a selected depth in the receptacle such that the lower end is immersed in a corresponding blood or other liquid component. That component may then be aspirated through the pipe.

DETAILED DESCRIPTION OF PREFERRED EMBODIMENTS

Other objects, features and advantages will occur from the following description of a preferred embodiment and the accompanying drawings, in which.

Figure 1:
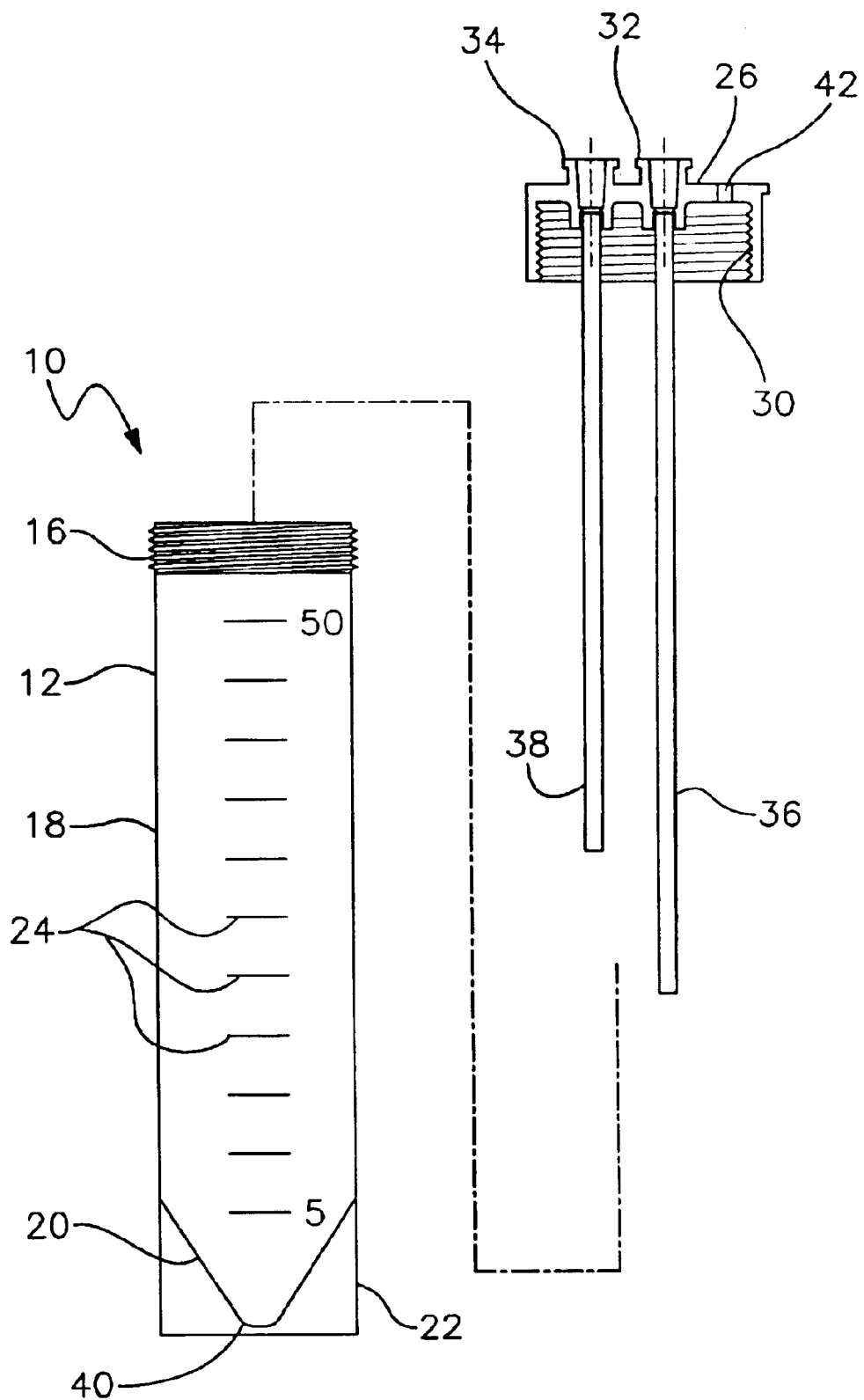
FIG. 1 is an elevational, exploded view of a preferred centrifuge tube assembly in accordance with this invention.

There is shown in FIG. 1 a centrifuge tube assembly 10 that includes a tubular or cylindrical receptacle 12 and a cap 14 that is releasably engaged with an open upper end of receptacle 12. The tubular receptacle and cap are typically composed of a durable plastic material such as polypropylene or other material is suitable for medical, veterinary and other and centrifuging applications. Shatter resistant glass may also be employed.

Receptacle 12 has exterior threads 16 formed proximate the upper end thereof. An elongate cylindrical outer wall 18 extends downwardly from the upper end of the tubular receptacle and terminates in a pointed or tapered bottom end 20. A cylindrical or annular base portion 22 is attached to and axially aligned with exterior wall 18. In most cases, portion 22 may be simply comprise a unitary continuation of exterior wall 18. Cylindrical base portion 22 surrounds tapered bottom end 20. In fact, the entire tubular receptacle 12 preferably comprises a single unitarily molded piece. In alternative embodiments, separately formed, interconnected pieces may be utilized. In either event, receptacle 12 includes an interior chamber that extends from the open upper end to tapered bottom end 20. This chamber accommodates blood, chemicals or other fluids being centrifuged.

A plurality of graduated volume markings 24 are formed along exterior wall 18. For example, as shown in FIG. 1, markings representing 5 ml and 50 ml, as well as various intervals therebetween, may be formed along exterior wall 18. Each marking indicates the volume of liquids contained within the tubular receptacle at that level. For example, when the upper surface of the blood or other liquid is at a level represented by "5 ml", this indicates that the tube is holding 5 ml of liquid. Likewise, if the top of the liquid within the tube is at "50 ml", this indicates that 50 ml of liquid are accommodated. The tubular receptacle may accommodate a wide range of volumes according to this invention.

Cylindrical base portion 22 supports the entire tubular receptacle 12 and allows it to stand upright on a table or other flat surface. In this manner, the graduated markings 24 plainly indicate the volume of liquid that is accommodated within the tubular receptacle 12.

It should be understood that the tubular receptacle described above is a known item. Such products are manufacturer by various companies such as Corning.

Assembly 10 also includes a unique closure or cap 14 in accordance with this invention. In the version shown in FIG. 1, the cap, which is shown in cross section, features a generally horizontal top surface 26 and annular peripheral portion 28 that depends from top surface 26. Peripheral portion 28 includes interior threads 30 that operably engage exterior threads 16 of receptacle 12 to releasably attach cap 14 to receptacle 12.

A pair of aspiration ports 32 and 34 are formed through to surface 26 of cap 14. The ports may comprise Luer™ type ports that are formed either unitarily with surface 26 or which are fitted through and secured within respective openings in surface 26. These ports are described in greater detail below.

A pair of elongate aspiration pipes 36 and 38 are engaged with ports 32 and 34, respectively, and extend downwardly from cap 14. The pipes are composed of a relatively durable plastic or glass material. Pipe 36 is somewhat longer than pipe 38. The respective lengths may vary within the scope of this invention but in all cases the lengths should differ. When cap 14 is threadably interengaged with tubular receptacle 12, the aspiration pipe 36 extends downwardly through receptacle 12 such that it engages or virtually engages pointed lower end 40. At the same time, pipe 38 extends downwardly through the tube approximately to the level indicated by the "5 ml" mark. This positioning permits blood products and other fluids to be aspirated in a discrete fashion, in accordance with the method described below. The pipes may be composed of polypropylene and have respective diameters of about 3 mm. Other dimensions may also be used.

A 1–2 mm vent hole 42 is formed through surface 26 of cap 14 adjacent port 32. This vent hole maintains a stable neutral pressure within tubular receptacle 12 during the aspiration process. The vent may be formed at various locations in the cap.

Figure 2:
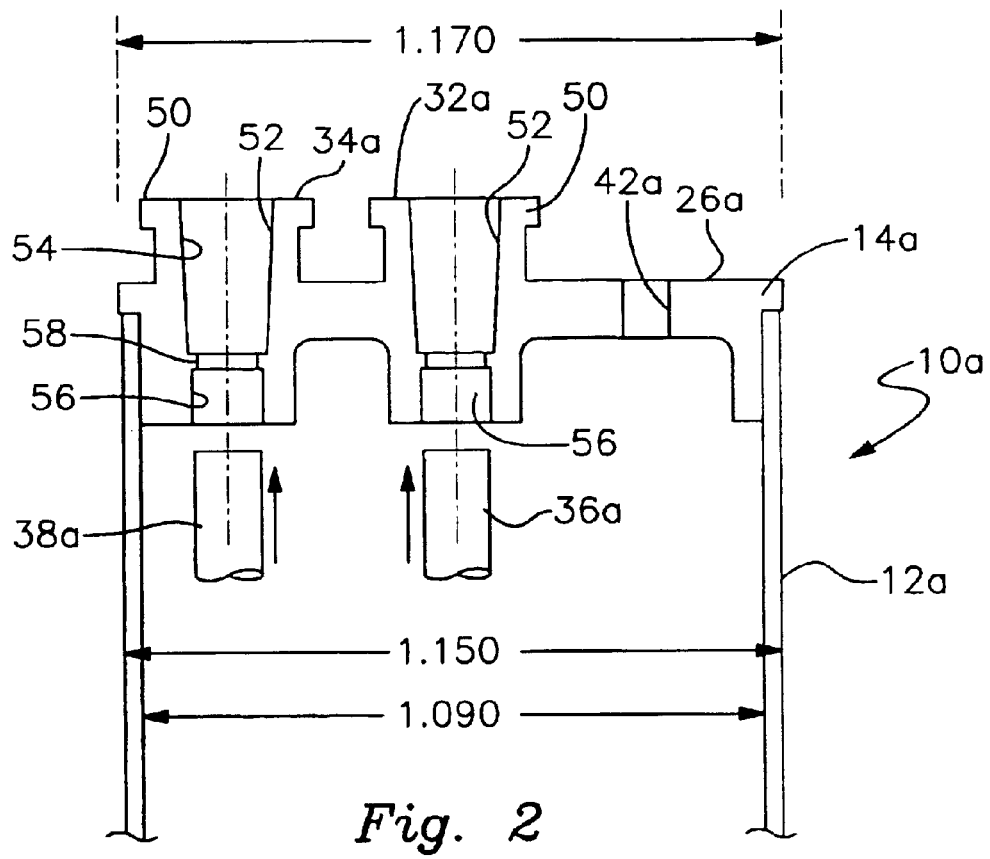
FIG. 2 is an elevational, cross sectional view of the centrifuge tube assembly employing an alternative cap construction.
Figure 3:
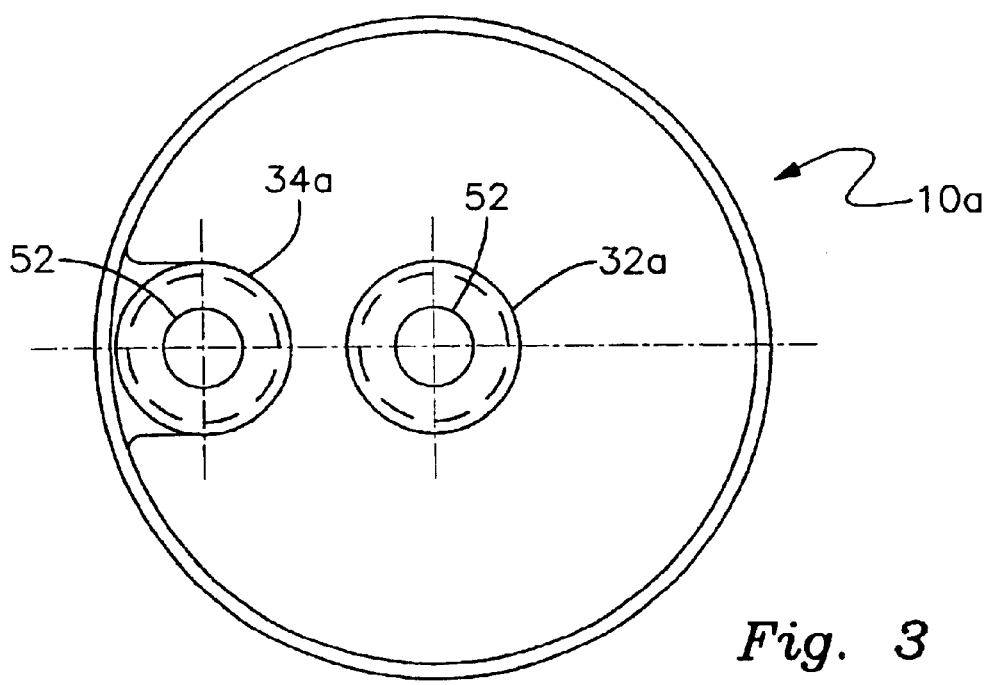
FIG. 3 is a top plan view of the assembly of FIG. 2.

A slightly modified centrifuge assembly 10a is depicted in FIGS. 2 and 3. In this version, cap 14a interengages tubular receptacle 12a in a relatively snug interference or friction fit. It should be understood that in still other embodiments, the cap may include exterior threads that interengage interior threads in the tubular receptacle. The closure may also be permanently secure to the receptacle.

Once again, a pair of Luer™ ports 32a and 34a are formed in top surface 26a of wall 14a. Each of the ports includes an exterior flange 50 and an interior channel 52 that extends completely through the port and communicates with the interior of tubular receptacle 12a. More particularly, each channel 52 has an upper portion 54, a lower portion 56 and an intermediate portion 58 that communicably interconnects portions 54 and 56. The upper end of a first aspiration pipe 36a is snugly received in lower portion 56 of the channel 52 formed through port 32a. Similarly, an upper end of second aspiration pipe 38a is snugly received in portion 56 of the channel 52 formed through port 34a. A pressure neutralizing vent hole 42a is again formed through upper surface 26a in communication with the interior of tubular receptacle 12a. FIG. 2 contains examples of preferred dimensions (in inches) for the tubular receptacle and cap. It should be noted, however, that these are examples only and are not limitations of the invention. Various other dimensions may be utilized. In alternative embodiments, the port may be formed in one piece with the engaged pipe or attached communicably to the port in various other ways. The port may have other assorted configurations and constructions, which enable aspiration to be performed through the attached pipe.

FIGS. 4–7 illustrate the use of assembly 10 for aspirating blood products or other chemicals or fluids. It should be understood that alternative versions of the assembly, such as assembly 10a, FIGS. 2 and 3, may be utilized in an analogous fashion. The process is performed in conjunction with a standard hypodermic syringe 60, FIG. 4, of the type commonly used to perform aspiration. Also employed is a conventional centrifuge, not shown. Various types of centrifuges, which will be known to persons skilled in the art, may be utilized in combination with the tube assembly of this invention.

A preferred use for centrifuge tube assembly 10 is separating a sample of blood into constituent blood products. Typically, it is desirable to separate the platelets from the red blood cells and plasma such that a platelet-rich blood product may be used in various surgical and medical applications. This process is performed in the following manner.

Initially, with cap 14 secured to receptacle 12, blood is introduced into the receptacle through one of the ports 32, 34 until a selected level is introduced into the receptacle. A syringe may be used for the purpose. Alternatively, if the cap is removable, cap 14 may be removed from tubular receptacle 12 and the chamber of receptacle 12 filled with a blood sample B, FIG. 4, to a selected level. For human blood work, the selected volume of blood may be, for example, 50 ml. This volume is preferred because it typically yields approximately 5 ml of platelet-rich blood product. Other volumes may be used as required. After tubular receptacle 12 is filled with blood sample B, cap 14 is attached to (i.e. screwed onto) the tubular receptacle, if required, in the manner previously described. Or, as stated, the receptacle may be permanently covered by the closure. In either case, aspiration pipes 36 and 38 extend downwardly through receptacle 12. In particular, pipe 36 touches or extends very close to pointed lower end 40 of receptacle 12. Pipe 38 extends approximately to the "5 ml" mark on the exterior wall of the tube.

After the blood sample is introduced into the tubular receptacle and the cap is screwed onto the tube, assembly 10 is placed in a centrifuge, either by itself or with other tubular assemblies. A second cap or closure (not shown) may be attached to the assembly such that the ports and vent hole are covered. The centrifuge is then operated for a selected time period (e.g. preferably 5–7 minutes) in order to separate the components of blood sample B.

Figure 5:
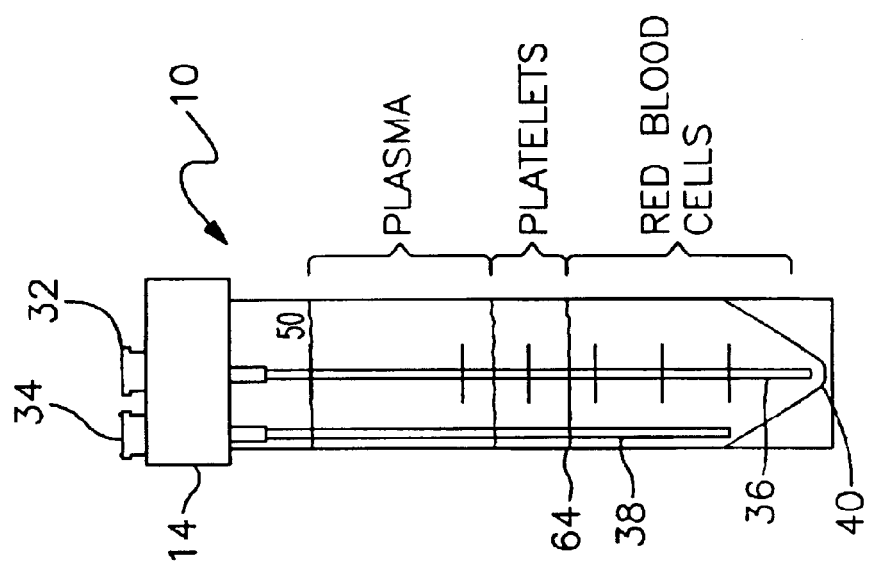
FIG. 5 is an elevational view of the tube after blood within the tube has been centrifuged into three component products: red blood cells, platelets and plasma.
Figure 4:
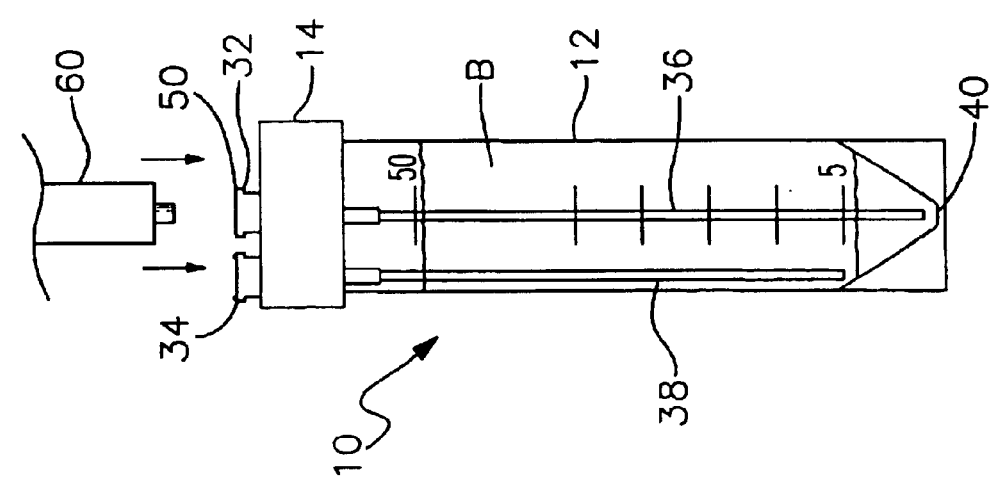
FIG. 4 is an elevational view of the tube of FIG. 1 in an assembled condition and with a hypodermic needle positioned above the tube prior to aspiration of the contents of the tube.
Figure 7:
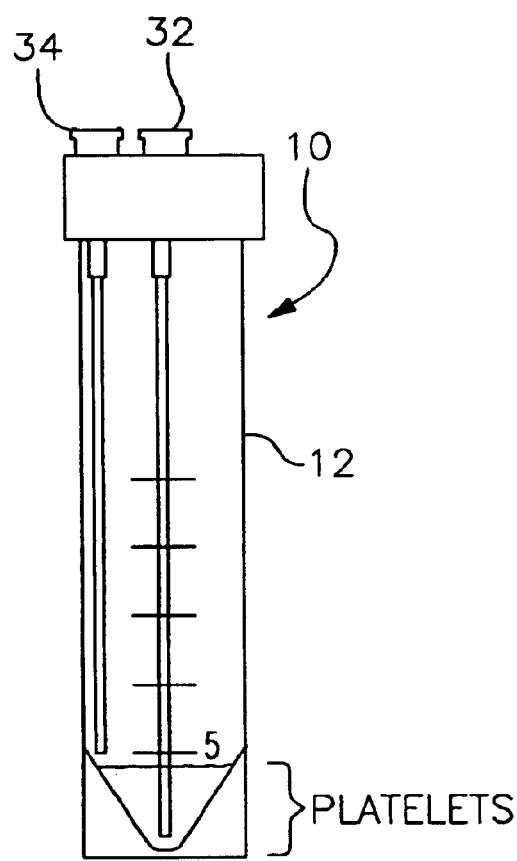
FIG. 7 is a view similar to FIGS. 5 and 6 after most of the plasma layer has been aspirated through the second aspiration pipe such that a platelet-rich blood product remains within the tube.

After centrifuging is complete, assembly 10 is removed from the centrifuge and supported by base portion 22 on a table. The blood sample then appears as shown in FIG. 5. Specifically, centrifuging causes the red blood cells to collect in a discrete, dark layer at the bottom of cylinder 12. A discrete layer of plasma exhibiting a yellow color is formed at the upper end of the cylinder. An intermediate layer of platelets in the form of a white "buffy coat" is disposed between the plasma and red blood cell layer. The user next aspirates the red blood cells from the sample. This is accomplished by engaging syringe 60 (FIG. 4) with Luer™ port 32, FIGS. 2–7. Specifically, syringe 60 engages the flange 50 of port 32 and is received within the upper portion 54 (FIG. 2) of the port. The syringe is then operated in a known manner to draw red blood cells upwardly through pipe 36 and outwardly through port 32. Red blood cells are aspirated through pipe 36 until the boundary 64 between the red blood cells and platelets reaches the lower end 40 of cylinder receptacle 12. At this point, most of the red blood cells have been removed from the sample.

Figure 6:
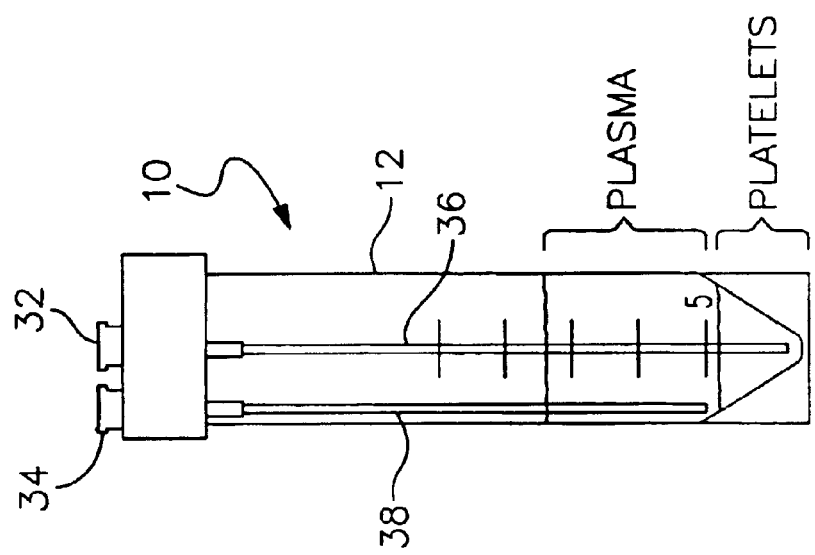
FIG. 6 is a view similar to FIG. 5 after the red blood cell layer has been aspirated and following a second centrifuging step.

The user then disengages the syringe from cap 14 and replaces assembly 10 in the centrifuge. The remaining blood product is centrifuged for an additional period of typically 5–7 minutes. It should be noted the centrifuging times may be varied from the ranges according to this invention. After the second centrifuging step is completed, the blood sample, as shown in FIG. 6, includes an upper layer of plasma and a lower layer containing approximately 4–5 ml of platelets. The technician or other user then engages an aspirating syringe with the flanged outer end of port 34. The syringe is operated as previously described to aspirate the plasma layer through aspiration pipe 38 and port 34. This aspiration process continues until the fluid level drops below the lower end of pipe 38. At this point approximately 5 ml of blood product remains in tube 12. See FIG. 7. This remaining product contains a very high concentration of blood platelets (i.e. about 4 ml platelets and 1 ml plasma). The platelet-rich plasma may then be used as required for various surgical and other medical procedures.

Figure 8:
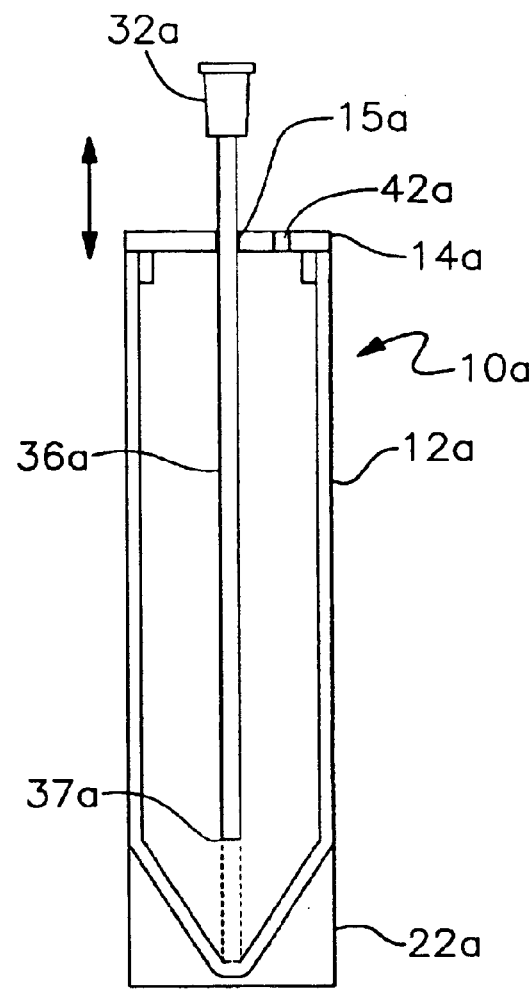
FIG. 8 is an elevational, cross sectional view of an alternative assembly according to this invention.

An alternative centrifuge tube assembly 10a according to this invention is disclosed in FIG. 8. Assembly 10a again includes a receptacle 12a having a cap or closure 14a attached permanently or releasably to the upper end thereof. In this version, a central hole or opening 15a is formed through closure 14a in communication with the interior of receptacle 12a.

A Luer™ type aspiration port 32a is communicably engaged at an upper end of an elongate aspiration pipe 36a. The construction of the port and the pipe are analogous to those described in the previous embodiment, with the exception of the port is not formed unitarily with closure 14a. A snug, communicable fit is formed between port 32a and pipe 36a. In this embodiment, the pipe is received by opening 15a in closure 14a. The pipe is longitudinally slidable through the opening 15a and therefore is longitudinally adjustable with respect to receptacle 12a. The user may slide pipe 36a through hole 15a so that the lower end 37a the pipe is positionable at a selected depth within receptacle 12a. As indicated in phantom, the lower end of the pipe may be positioned proximate to or actually touch the lower, conical end of receptacle 12a.

In the embodiment of FIG. 8, blood or other fluid is introduced into the receptacle and centrifuged in a conventional manner. After centrifuging is complete, pipe 36a is slid longitudinally through hole 15a to and immersed to a selected depth within the centrifuge fluid. Alternatively, the pipe may be introduced through the opening in closure 14a prior to centrifuging. In either case, the pipe may be quickly and conveniently positioned within the fluid so that a selected corresponding component of the fluid may be aspirated. This step is accomplished in a manner analogous to that previously described. A syringe or other aspirating device is engaged with port 32a. The aspirating device is operated so that the selected component of the fluid product (i.e. the component in which the lower end 37a of pipe 36a is immersed) is aspirated upwardly through the pipe due to the suction of the syringe or other aspirating device. Multiple discrete layers of fluid components may be aspirated in this manner by simply adjusting the position of the pipe to place the lower end of the pipe at a selected depth for each corresponding fluid component.

As in the prior embodiments, closure 14a includes a vent hole 42a that equalizes the pressure within receptacle 12a during aspiration. A supportive base 22a may also be employed. The materials of construction, graduated markings and other features of the prior embodiment may similarly be employed in the second version of this invention. It should be noted that the number of aspiration pipes may be varied from those disclosed in either of the embodiments described herein. Various lengths of pipe may be employed within the scope of the invention.

The centrifuge tube disclosed herein may be employed in a wide variety of medical, biomedical, veterinary and other types of procedures. When veterinary blood work is involved, the tube will typically comprise a much larger volume than is utilized during human blood work.

The devices and processes described above allows a blood sample to be conveniently separated into discrete blood products which may then be sequentially aspirated or removed so that a platelet-rich product remains. This entire procedure is performed without excessive mixing or cross-contamination of the individual components. The separation process is performed more quickly, inexpensively, efficiently and effectively than has heretofore been possible using known centrifuge tubes.

It should be further understood that the centrifuge tube assemblies of this invention may also be employed to separate various other types of fluids and chemicals. Likewise, in such applications the individual components may be sequestered and removed quickly and conveniently, without undue mixing and cross-contamination.

From the foregoing it may be seen that the apparatus of this invention provides for improved centrifuge tube which enables chemicals or bodily fluids to be effectively aspirated after they have been centrifuged. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. An assembly for holding a blood product and for being centrifugally driven to separate the blood product into discrete components, which are retrievable from said assembly through aspiration, said assembly comprising:

a receptacle including not more than a single chamber for accommodating a consolidated volume of blood product, said receptacle being adapted to be centrifugally driven for separating the blood product into discrete components, which are formed in respective layers within the consolidated volume of blood product in said chamber;

a pair of aspiration ports having respective aspiration pipes attached communicably thereto;

a closure for attaching to and covering an upper end of said receptacle, said closure for supporting said ports and engaged pipes in communication with said single chamber of said receptacle such that said ports are exposed exteriorly of said receptacle and each said engaged pipe extends downwardly through said chamber to a depth at which a corresponding blood component may be aspirated from said chamber through said pipe; and said pair of aspiration pipes for extending to different respective depths within the consolidated volume of blood product in said chamber, whereby a respective blood component may be aspirated through each said pipe.

2. The assembly of claim 1 in which said receptacle includes an elongate tube.

3. The assembly of claim 1 in which said tube includes a cylindrical main portion and conically shaped lower end portion depending from said main portion.

4. The assembly of claim 1 in which a first one of said aspiration pipes includes a lower end that is disposed sufficiently close to a bottom of said tube such that a first blood component engaging said bottom of said first pipe is substantially entirely removable from said tube by aspiration through said pipe.

5. The assembly of claim 4 in which a second one of said aspiration pipes includes a lower end disposed sufficiently above said lower end of said first pipe such that said second pipe is immersible in a second blood component disposed above the first blood component for enabling aspiration of the second blood component through said second pipe.

6. The assembly of claim 4 in which said first pipe extends substantially to said bottom of said tube.

7. The assembly of claim 1 in which said pipe is interengaged in a snug communicative fit with said port.

8. The assembly of claim 1 in which said closure has a vent hole for communicating with said interior of said receptacle and neutralizing pressure variations caused by aspiration in said receptacle.

9. The assembly of claim 1 in which said port is engaged directly with said closure.

10. The assembly of claim 1 in which said port is formed unitarily with said closure.

11. The assembly of claim 1 which said aspiration pipe is received by an opening through said closure and longitudinally slidable therethrough such that a lower end of said pipe is positionable at a selected depth within said receptacle.

12. The assembly of claim 1 in which each said port includes a channel having upper and lower portions that are separated by an intermediate portion, which intermediate portion is narrower than said upper and lower portions.

13. The assembly of claim 12 in which said upper portion is engageable by an aspirating syringe and wherein said lower portion is snugly engageable by a respective aspirating pipe.

14. The assembly of claim 1 in which each said port includes a flange for being engaged by an aspirating syringe to connect the syringe to said port.

15. An assembly for holding a blood product and for being centrifugally driven to separate the blood product into discrete components, which are retrievable from said assembly through aspiration, said assembiy comprising:

a receptacle for accommodating the blood product, said receptacle being adapted to be centrifugally driven for separating the blood product into discrete components, which are formed in respective layers within said receptacle;

at least one aspiration port having a respective aspiration pipe attached communicably thereto;

a closure for attaching to and covering an upper end of said receptacle, said closure for supporting said port and engaged pipe in communication with an interior of said receptacle such that said port is exposed exteriorly of said receptacle and said engaged pipe extends downwardly through said interior of said receptacle to a depth at which a corresponding blood component may be aspirated through said pipe; and said receptacle being attached to a base for supporting said receptacle in an upright condition upon an underlying surface.

* * * * *